United States Patent [19]

Gloss et al.

[11] Patent Number: 4,594,981

[45] Date of Patent: Jun. 17, 1986

[54] METHOD AND APPARATUS TO CONTROL IGNITION TIMING DURING STARTING OF AN EXTERNALLY IGNITED INTERNAL COMBUSTION ENGINE

[75] Inventors: Erwin Gloss, Korntal; Edmund Jeenicke, Schwieberdingen; Gerhard Lotterbach, Markgröningen; Egbert Perenthaler, Stuttgart; Manfred Schenk, Schorndorf; Jan F. van Woudenberg, Markgröningen; Udo Zucker, Bönnigheim, all of Fed. Rep. of Germany

[73] Assignee: Robert Bosch GmbH, Stuttgart, Fed. Rep. of Germany

[21] Appl. No.: 647,701

[22] Filed: Sep. 6, 1984

[30] Foreign Application Priority Data

Sep. 23, 1983 [DE] Fed. Rep. of Germany ....... 3334389

[51] Int. Cl.[4] .......................................... F02D 41/02
[52] U.S. Cl. ..................................... 123/424; 123/480
[58] Field of Search ................ 123/424, 418, 179 BG, 123/179 B, 179 R

[56] References Cited

U.S. PATENT DOCUMENTS

| | | | |
|---|---|---|---|
| 4,250,858 | 2/1981 | Jeenicke et al. | 123/480 |
| 4,364,344 | 12/1982 | Butemeister | 123/424 |
| 4,380,983 | 4/1983 | Kobashi et al. | 123/424 |
| 4,416,234 | 11/1983 | Ikeura | 123/424 |
| 4,442,812 | 4/1984 | Mizuno et al. | 123/424 |
| 4,442,813 | 4/1984 | Nagose et al. | 123/424 |
| 4,458,646 | 7/1984 | Suzuki et al. | 123/424 |

OTHER PUBLICATIONS

"Bosch Technical Reports", vol. 5 (1977), pp. 250-256.

*Primary Examiner*—Raymond A. Nelli
*Attorney, Agent, or Firm*—Frishauf, Holtz, Goodman & Woodward

[57] ABSTRACT

To place the maximum combustion pressure, which occurs upon ignition, after the piston of an internal combustion engine (ICE) has passed upper dead-center (UDC) position upon starting, a predetermined time interval (Ti) is subtracted from the expected time the piston reaches UDC position, as determined by the time taken for a predetermined angular distance of the crankshaft to rotate; the time between the predetermined angular distances is extrapolated to determine the projected, or expected time of the UDC position. The predetermined time interval (Ti), which may be made dependent upon engine temperature, is then subtracted and the actual firing time computed, for example by counting-out in a counter the differential time interval determined by the subtraction. The timing intervals are preferably derived from a segmental marker system (20,21; A1,A2), in a counter (1), the extrapolation carried out in a multiplier (2) and the subtracting in a subtraction circuit (3). The system is preferably enabled upon closing of the starter switch (S) and may be disabled when a down-counter, determining the actual timing interval, has a negative count output.

3 Claims, 2 Drawing Figures

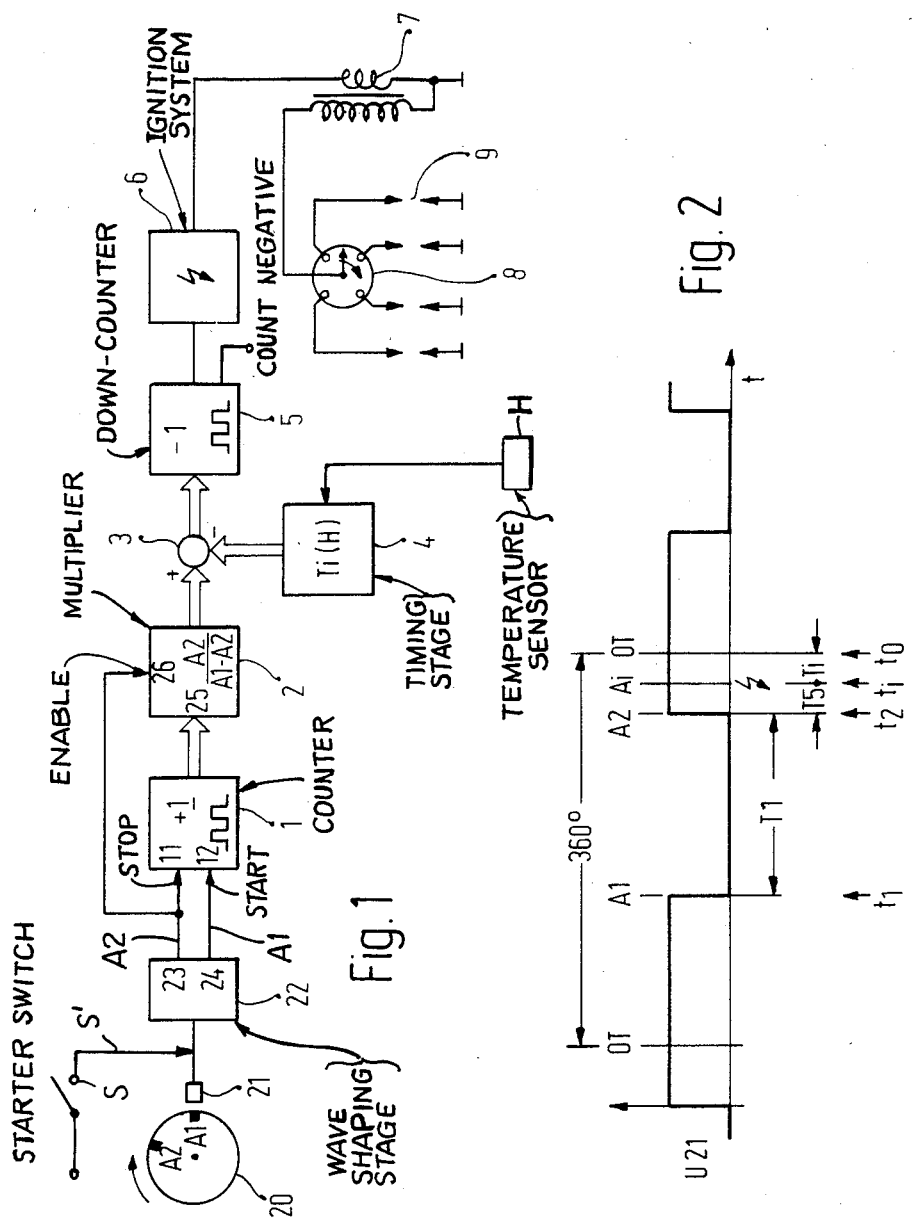

METHOD AND APPARATUS TO CONTROL IGNITION TIMING DURING STARTING OF AN EXTERNALLY IGNITED INTERNAL COMBUSTION ENGINE

Reference to related patent, the disclosure is hereby incorporated by reference:
Assigned to the Assignee of this application:
U.S. Pat. No. 4,250,858, Jeenicke et al.
"Bosch Technical Reports", Vol. 5 (1977), pp. 250-256.

The present invention relates to internal combustion engines of the Otto-type, and more particularly to a method and apparatus to facilitate starting of such engines by suitable control of the timing of an ignition pulse applied to the sparkplug of the engine.

BACKGROUND

It is well known to control the timing of ignition, that is, the timing of flash-over of the spark of a sparkplug, as a function of crankshaft angle of the crankshaft to which the pistons of the internal combustion engine (ICE) are connected. The timing of ignition, with respect to crankshaft angle, can be changed in dependence on various parameters and operating conditions of the ICE. An apparatus to control the occurrence of the spark pulse with respect to crankshaft angle is described in the referenced angle U.S. Pat. No. 4,250,858, Jeenicke et al, assigned to the assignee of the present application. This patent describes a system suitable to control the occurrence of the ignition pulse with respect to the crankshaft of the engine.

Usual control apparatus, that is, control apparatus which operates electronically, as well as control apparatus which operates mechanically, as customary in earlier engines, changes the occurrence of the ignition spark with respect to crankshaft angle only when the engine has reached a certain minimum speed, for example a minimum speed close to and just below idling speed. A typical speed in vehicular-type ICEs, for example, as used in passenger automobiles, is about 600 rpm. Mechanical ignition timing elements usually do not respond at all below that minimum speed. What has been done, customarily, is to set the occurrence of the ignition pulse with respect to a few degrees of crankshaft angle in advance of upper dead-center (UDC) piston of a position in a cylinder. In electronic incremental, or segmental control systems, as described, for example, in the referenced U.S. Pat. No. 4,250,058 and, also, in the referenced "Bosch Technical Reports", Vol. 5, pp. 250-256, change of occurrence of the ignition pulse with respect to crankshaft angle is possible only within a very restrictive angular extent, so that, below a certain speed, the ignition occurrence was controlled to a fixed angle with respect to crankshaft rotation.

During starting, customary automotive-type ICEs are driven at speeds which may reach up to 250 rpm—that is, substantially below the idling speed. Fixed setting of ignition angle with respect to crankshaft rotation which is suitable for idling speed or for a minimum speed of about 600 rpm is not optimal at the starting speed. The duration of combustion of the fuel-air mixture within the combustion chamber of the ICE is, usually, about two milliseconds. The maximum pressure within the combustion chamber of the cylinder, at lower and lower speed, thus will occur earlier—with respect to UDC position of the piston—which, with increasing compression, may lead to knocking or pinging, and starting difficulties.

THE INVENTION

It is an object to so control the occurrence of sparks by the sparkplug of an ICE during the starting process that starting is facilitated and reliably insured.

Briefly, rather than controlling the occurrence of the spark with respect to an angular position of the crankshaft, or of a piston, respectively, with respect to UDC position, the occurrence of the spark is controlled with respect to time during starting, independently of actual rotary speed of the engine. Thus, reliable starting is insured although the starting speed may be very low, for example, due to a low charge state of the battery energizing the starter. The timing is so arranged that maximum pressure during the explosion of the fuel-air mixture always will occur after the piston has reached, or passed, UDC position.

In accordance with a feature of the invention, a fixed time period, which depends on the operating data of the individual ICE with which the system is to be used, is provided, and controls ignition. The start of the time period is related to a predetermined angle of crankshaft, or piston position in advance of UDC position. Upon starting the engine, and run-up of speed thereof, the ignition timing thus is automatically changed to the appropriate timing instant, considering engine operating characteristics, without requiring any complication.

The system has the advantage that starting will be more reliable, run-on of the engine will be improved, so that idling speed, or any higher commanded speed, will follow smoothly after the initial starting of the engine. The engine is less stressed, and knocking or pinging, due to premature combustion, is reliably avoided.

The system can be easily modified to change the timing in dependence on ambient conditions, in which, for example, the effects of temperature of the engine are particularly important. Thus, starting of the engine under any conditions, whether cold or hot, is facilitated.

DRAWINGS

FIG. 1 is a schematic diagram of the apparatus in accordance with the invention; and FIG. 2 is a diagram illustrating various signals within the system of FIG. 1, and used in explanation of the operation of the system.

DETAILED DESCRIPTION

The ignition system of FIG. 1 is illustrated in connection with a segmental-type sensing system, in which ignition instants with respect to crankshaft angle are determined by sensing the occurrence of a predetermined crankshaft angle of the crankshaft with respect to a reference or datum. The angular segment, thus obtained, is applied to an ignition computer. Typically, the angular segment includes 35° of crankshaft rotation, occurring between a leading marker (A1) located for example 60° in advance of UDC and a trailing marker (A2), occurring at 25° in advance of UDC. The angular segment is defined by a rotating disk 20, or the like, which rotates in synchronism with the crankshaft of the engine.

The angular segment transducer includes the segmental marker disk 20, and a fixed pickup or sensor 21. The disk 20 includes, for example, a pair of magnetic or optical elements located at positions A1 and A2. The fixed sensor 21, electromagnetically, optically, or by other suitable means, senses the passage of the markers A1,A2 and disk 20 passing the fixed sensor 21, and provides an output signal which is connected to a wave-shaping stage 22. The wave-shaping stage 22 has two outputs at terminals 23,24. One output, terminal 23, is connected to an input 11 of a counter 1 and, further, to an enabling input 26 of a multiplier 2. Another output 24 of the wave-shaping stage 22 is connected to a second input 12 of the counter 1. The outputs of the counter 1 are connected to an input 25 of the multiplier 2. The multiplier 2 is connected to the positive or direct input of a subtracting stage 3. The subtracting or negative input of the subtracting stage 3 is connected with the output of a timing circuit 4. The output of the subtracting stage 3 is connected to the input of a down-counter 5, the output of which is connected to the input of an ignition shown schematically only by block 6 and of any suitable and well-known construction. The output of the ignition system 6 is connected through the primary winding of an ignition coil 7 to a distributor 8 to distribute spark energy to sparkplugs 9, all shown only schematically and of any suitable and well-known construction. The primary and secondary windings of the ignition coil 7 have a common terminal, connected to ground or chassis of the motor vehicle, to which, also, the second terminals of the sparkplugs 9 are connected.

Two segmental markers of the angular segment transducer 20,21 are each sensed by the pickup 21 and so evaluated in the wave-shaping stage 22 that the output 24 will have a single pulse occur thereat when the first marker A1 occurs in advance of, or passes the pickup 21. The output 23 will have a single pulse occur thereat when the second marker A2 occurs in front, or passes the pickup 21. The wave-shaping stage 22, thus, may have, for example a monostable flipflop which provides output pulses upon first being SET when the marker A1 passes the pickup 21 and providing another pulse when the marker A2 passes in advance of the pickup 21 to provide for RESET thereof.

The system is controlled to operate by providing a fixed time in advance of UDC position of a piston, or the crankshaft of the engine under starting conditions. Consequently, the system is enabled upon operation of the starter switch S, as schematically indicated, connected to the system by an enabling line S'.

FIG. 2 illustrates the sensor signal U21 with respect to time, in idealized form, that is, as a square wave, for example as wave-shaped in wave-shaping stage 22. Counter 1 is a counter which has an internal start-stop oscillator to provide a time basis, or which is connected to a system clock to provide a time basis, with start and stop connecting terminals 12,11, respectively. A pulse at input 12 causes the counter 1 to start counting until a pulse is derived at terminal 11, at which time the counter 1 will stop counting. The resulting count, which is representative of a time interval due to the timing of the clock pulses, is multiplied in the multiplier 2. The count which is obtained, that is, upon stopping of counting, is the start of the multiplication process, and terminal 23 of the wave-shaping stage 22 is connected to the "enable" input 26 of the multiplier 2 to enable the multiplier 2 to start multiplying since the counting in counter 1 has then stopped. The subtraction stage 3 is used to subtract from the multiplied result a time interval Ti. This time interval may be a fixed amount of time or may vary in dependence on temperature of the engine, as applied to the timing stage 4, for example by a temperature sensor schematically shown at H. Consequently, the timing interval Ti is indicated to be a function of temperature, mathematically, Ti(H). The temperature sensor H is not strictly necessary and, if not used, the timing interval Ti can then be a fixed preset value which will be set into the system once, related only to the operating characteristics of the engine with which the system is being used.

The subtracted multiplication derived from the subtracting stage 3 is then entered into the down-counter 5. The down-counter 5 is a counter similar to counter 1 which has a built-in clock, or receives an external clock signal to provide a time basis. The time bases of counters 1 and 5 are synchronous. When the counter 5 has counted to a predetermined level, for example, when the counter 5 is counted down to zero, a pulse is provided to the ignition system 6 which triggers the ignition system to generate a spark, as is well known, by ignition coil 7, and distributor 8 in one of the sparkplugs 9 of the respective cylinders of the ICE.

When the marker A1, at time (t1) passes the pickup 21, the count state in counter 22 is first cancelled or erased and the counter is then restarted. At occurrence of the second marker A2, the counter 1 is stopped. The numerical value within the counter, then, will be inversely proportional to engine speed. The angular distance between the markers A1 and A2 and between A2 and UDC position of the crankshaft is independent of rotary speed—see FIG. 2. Keeping the counting frequency constant, UDC position would be reached if one would multiply the count state of the counter 1 with the angular relationship between the angles A1-A2 and A2-UDC, starting from time instant t2. In other words, keeping the counting frequency of the counter constant, and assuming uniform speed, the angular position of UDC can be obtained by extrapolating the count state of the counter 1 which it had reached upon counting between the markers A1 and A2, starting from the instant t2. In accordance with the present invention, the actual ignition timing ti is obtained from t2 by subtracting the time interval Ti from the extrapolated number representative of UDC. Consequently, the actual ignition timing will occur at a predetermined time interval in advance of UDC position, regardless of the speed of the engine at that time. The actual time interval Ti is determined by the operating characteristics and parameters of the engine.

This can be expressed mathematically:

$$T5 = T1 \cdot \frac{A2}{A1 - A2} - Ti(H) \tag{1}$$

In the foregoing, T5 is that time instant during at which ignition actually occurs, and is that time which is required by the down-counter 5 to trigger the ignition event at the instant ti in advance of UDC position, which would occur at time $t_0$, at UDC position, that is, with an ignition timing—as distinguished from angle of crankshaft rotation—in advance of UDC position.

The operating temperature H of the ICE can be introduced into the timing stage Ti, by a temperature sensor H since different temperature conditions of the engine may result in different compositions of the fuel-air mixture being supplied to the ICE, which have an effect on the duration of combustion within the combustion chamber of the respective cylinders of the ICE.

After starting, that is, when the down-counter 5 due to the higher speeds counts to a negative value, the system is disabled and the control of ignition timing, as described for example in the reference publications, it will be effected by ignition timing computers or systems, as is well known in this technology. Of course, release of the starter switch likewise may be used to transfer ignition timing to an ignition timing computer, as described in the references; the system may, however, also be so arranged that closing of the starter switch places control of ignition timing under the system as described in FIG. 1 and retains this arrangement until the down-counter 5 provides a negative value, so that, if an operator holds the ignition switch for an unduly long time, even though the starter may have already "kicked out", ignition timing reverts to the ignition computer.

Various changes and modifications may be made within the scope of the inventive concept.

We claim:

1. An apparatus to control ignition timing, during starting of an internal combustion engine (ICE) having a starter switch (S) providing a starting signal, and comprising, in accordance with the invention, means (20, 21, 22 1, 2) for determining the projected time of occurrence of the upper-dead-center (UDC) position of a piston of the engine including:

a segmental disk (20) having a pair of markers (A1, A2);

a pickup (21) responsive to passage of the markers;

a wave-shaping stage (22) providing output signals representative of passage of any one of the markers (A1, A2) past the pickup (21);

a timing circuit (1) providing a time base to determine the time lapse between passage of the respective markers (A1, A2) past the pickup (21), and to permit extrapolation to determine said projected time of occurrence of a piston at the UDC position; and computation means (2) computing said projected time of occurrence of the UDC position of the piston of the engine in accordance with an extrapolated relationship;

a timing stage (4) providing a predetermined time interval (Ti); an engine temperature sensor (H) coupled to said timing stage (4); means (5–9) for generating a spark discharge at a sparkplug; and means (3) coupled to outputs of the computation means (2) and of the timing stage (4) and subtracting the timing interval (Ti) from the projected time of occurrence of the UDC position, said subtraction means (3) being connected to and controlling the spark generating means (5–9) in accordance with the relationship:

$$T5 = T1 \cdot \frac{A2}{A1 - A2} - Ti(H)$$

wherein T5 is the actual timing instant when spark generation is triggered;

T1 is a number representative of the elapsed time between passage of the two markers (A1, A2) past the pickup (21);

A1 and A2 are representative of the respective angular positions, with respect to said UDC position, of the markers on said disk; and Ti(H) is a timing interval whose value is a function of engine temperature;

to cause generation of a spark said predetermined time interval in advance of UDC position of the piston, to place the maximum pressure of combustion always after the UDC position of the piston, regardless of speed of operation of the engine.

2. Apparatus according to claim 1, wherein said computation means comprises a first counter (1) determining the time duration (T1);

a multiplier (2) connected to and controlled by the counter and multiplying the count number (Ti) of the counter by a factor A2/(A1–A2), said factor being added to the count state of the counter (1) to derive the projected UDC time, and wherein the subtraction means (3) subtract said predetermined time interval (Ti) from the projected time;

and further including a second counter (5) counting the resulting difference, and providing a control signal to the ignition pulse generating means (5–9) to trigger an ignition event.

3. A method of controlling ignition timing, during starting, of an internal combustion engine (ICE) having an ignition system with a starter switch (S) providing a starting signal, a segmental disk (20), coupled to rotate with said ICE, and having a pair of markers (A1, A2);

a pickup (21) responsive to passage of the markers; and an engine temperature sensor (H); comprising the steps of upon occurrence of said starting signal, measuring the time (T1) between the respective passages of said markers (A1, A2) past said pickup (21);

extrapolating said time between passages (T1) to determine the expected time of occurrence of upper-dead-center (UDC) position of a piston of said engine;

deriving, as a function of engine temperature, a desired time interval (Ti), before said UDC position, for spark generation;

subtracting said time interval (Ti) from said expected time of occurrence of the upper-dead-center (UDC) position; and controlling the ignition instant (T5) in accordance with the result of said subtraction to occur said time interval (Ti) before UDC position, to assure that maximum combustion pressure always occurs after, rather than before, said piston has passed said UDC position, regardless of how slow engine speed may be during said starting.

* * * * *

UNITED STATES PATENT AND TRADEMARK OFFICE
CERTIFICATE OF CORRECTION

PATENT NO. :  4,594,981

DATED      :  June 17, 1986

INVENTOR(S) : GLOSS et al

It is certified that error appears in the above-identified patent and that said Letters Patent is hereby corrected as shown below:

Column 1, line 48, "piston of a position" should be -- position of a piston --

Signed and Sealed this

Twenty-eighth Day of April, 1987

Attest:

DONALD J. QUIGG

*Attesting Officer*   *Commissioner of Patents and Trademarks*